US009667960B1

(12) United States Patent
Allen

(10) Patent No.: US 9,667,960 B1
(45) Date of Patent: May 30, 2017

(54) LOW COMPLEXITY COST FUNCTION FOR SUB-PIXEL MOTION ESTIMATION

(71) Applicant: Altera Corporation, San Jose, CA (US)

(72) Inventor: Richard John Allen, London (GB)

(73) Assignee: Altera Corporation, San Jose, CA (US)

( * ) Notice: Subject to any disclaimer, the term of this patent is extended or adjusted under 35 U.S.C. 154(b) by 642 days.

(21) Appl. No.: 13/867,788

(22) Filed: Apr. 22, 2013

(51) Int. Cl.
*H04N 19/51* (2014.01)

(52) U.S. Cl.
CPC ............................. *H04N 19/00587* (2013.01)

(58) Field of Classification Search
CPC ................................................ H04N 19/00587
USPC .................................................... 375/240.16
See application file for complete search history.

(56) References Cited

U.S. PATENT DOCUMENTS

| 2004/0109503 | A1* | 6/2004 | Lee | ........................ H04N 19/51 375/240.16 |
| 2006/0093031 | A1* | 5/2006 | Van Der Schaar | .... H04N 19/61 375/240.01 |
| 2006/0133501 | A1* | 6/2006 | Lee | ........................ H04N 19/61 375/240.16 |
| 2008/0080617 | A1* | 4/2008 | Kodama | ................ H04N 19/56 375/240.16 |
| 2008/0130748 | A1* | 6/2008 | Robers | .................... H04N 19/61 375/240.16 |
| 2010/0316119 | A1* | 12/2010 | Mathew | ............... G06K 9/3266 375/240.03 |

* cited by examiner

*Primary Examiner* — Dave Czekaj
*Assistant Examiner* — Berteau Joisil
(74) *Attorney, Agent, or Firm* — Michael H. Lyons

(57) ABSTRACT

Methods and circuitry are provided for finding an optimum vector for motion-compensated prediction in video coding. Processing circuitry is operable to define a block in an image, the defined block having a plurality of pixels. A first set of residuals is calculated using a first motion vector. Each residual of the first set of residuals corresponds to a respective pixel within the plurality of pixels. Additionally, a first plurality of absolute differences is calculated. Each absolute difference in the first plurality of absolute differences is between a pair of residuals in the first set of residuals. The first plurality of absolute differences is summed, and is compared to sums of absolute differences of residuals calculated using other motion vectors. The motion vector corresponding to the lowest sum may be identified as an optimum motion vector.

20 Claims, 4 Drawing Sheets

LOW COMPLEXITY COST FUNCTION FOR SUB-PIXEL MOTION ESTIMATION

FIELD OF THE DISCLOSURE

This disclosure relates to methods and circuitry—e.g., on an integrated circuit device such as a programmable logic device (PLD)—for finding an optimum vector for motion-compensated prediction in video coding.

BACKGROUND OF THE DISCLOSURE

A video file is made up of a series of frames. Each frame may be similar to a few frames preceding it and a few frames following it. Often, several frames in a video file depict the same object, but the position of the object moves from frame to frame. Thus, significant portions of multiple frames may be translations (i.e., shifted versions) of a particular frame, known as a reference frame. A reference frame may be a frame of the video file, or a combination of two or more frames of the video file. To reduce the amount of memory needed to store a video file during video coding and compression, motion vectors representing translations of reference frames may be stored, rather than all information from every frame being stored. Because frames in a video file are not all perfect translations of a reference frame, each stored motion vector may have an associated error, which may also be stored.

Motion estimation is a well-known aspect of video coding and compression. Motion estimation is the process of selecting the best motion vectors for representing the spatial displacement between reference frames and other frames. A frame may be divided into multiple blocks of pixels, and an optimum motion vector may be determined for each block. Each block has a multitude of possible motion vectors (e.g., vectors that shift the block vertically, horizontally, or diagonally). A vector with the lowest cost, in terms of how much error results from using the vector, may be an optimum motion vector.

Various cost functions may be used to determine an optimum motion vector for each block. Common cost functions include sum of absolute difference (SAD) and sum of absolute transformed difference (SATD). The SAD cost function involves relatively simple calculations, but does not yield accurate results for non-integer vectors. The SATD cost function has better accuracy for sub-pixel vectors, but is expensive (e.g., in terms of processing power, latency time) because large 2-dimensional transforms must be calculated.

SUMMARY OF THE DISCLOSURE

The present disclosure relates to low-cost methods and systems for determining optimum motion vectors. For sub-pixel shifts of a block of pixels, low-frequency terms of the transformed block may not change much, while a high-frequency term may change significantly. Thus, cost functions, such as those described in the present disclosure, may achieve near-SATD accuracy, with less expensive calculations, by approximating a high-frequency term. In particular, a high-frequency term may be approximated by summing absolute differences of residuals for vertically and horizontally adjacent pixels in a block. By comparing sums of absolute differences of residuals corresponding to various sub-pixel vectors, an optimum motion vector may be determined. The methods and systems of the present disclosure may reduce gate counts on chips and latency time in computing optimum motion vectors, allowing for higher processing speed.

In accordance with embodiments of the present disclosure, there is provided an integrated circuit device having processing circuitry that may be operable to define a block in an image, the defined block having a plurality of pixels. The processing circuitry may also be operable to calculate a first set of residuals using a first motion vector. Each residual of the first set of residuals corresponds to a respective pixel within the plurality of pixels. In some embodiments, each residual may be calculated using luminance and chrominance values of a respective pixel. Each residual may be calculated based on a reference image shifted by less than one pixel. The processing circuitry may further be operable to calculate a first plurality of absolute differences. Each absolute difference in the first plurality of absolute differences may be between a pair of residuals in the first set of residuals. The processing circuitry may also be operable to sum the first plurality of absolute differences. Methods corresponding to the systems described above are also provided.

In accordance with additional embodiments of the present disclosure, there is provided an integrated circuit device that includes circuitry, for example core circuitry operating on a programmable logic device. The circuitry may be configured to define a block in an image, the defined block having a plurality of pixels. The circuitry may also be configured to calculate a first set of residuals using a first motion vector. Each residual of the first set of residuals may correspond to a respective pixel within the plurality of pixels. The circuitry may further be configured to calculate a first plurality of absolute differences. Each absolute difference in the first plurality of absolute differences may be between a pair of residuals in the first set of residuals. In addition, the circuitry may be configured to sum the first plurality of absolute differences.

BRIEF DESCRIPTION OF THE DRAWINGS

Further features of the disclosure, its nature and various advantages will be apparent upon consideration of the following detailed description, taken in conjunction with the accompanying drawings, in which like referenced characters refer to like parts throughout, and in which.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments; however, the figures may not necessarily not show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

Figure 1:
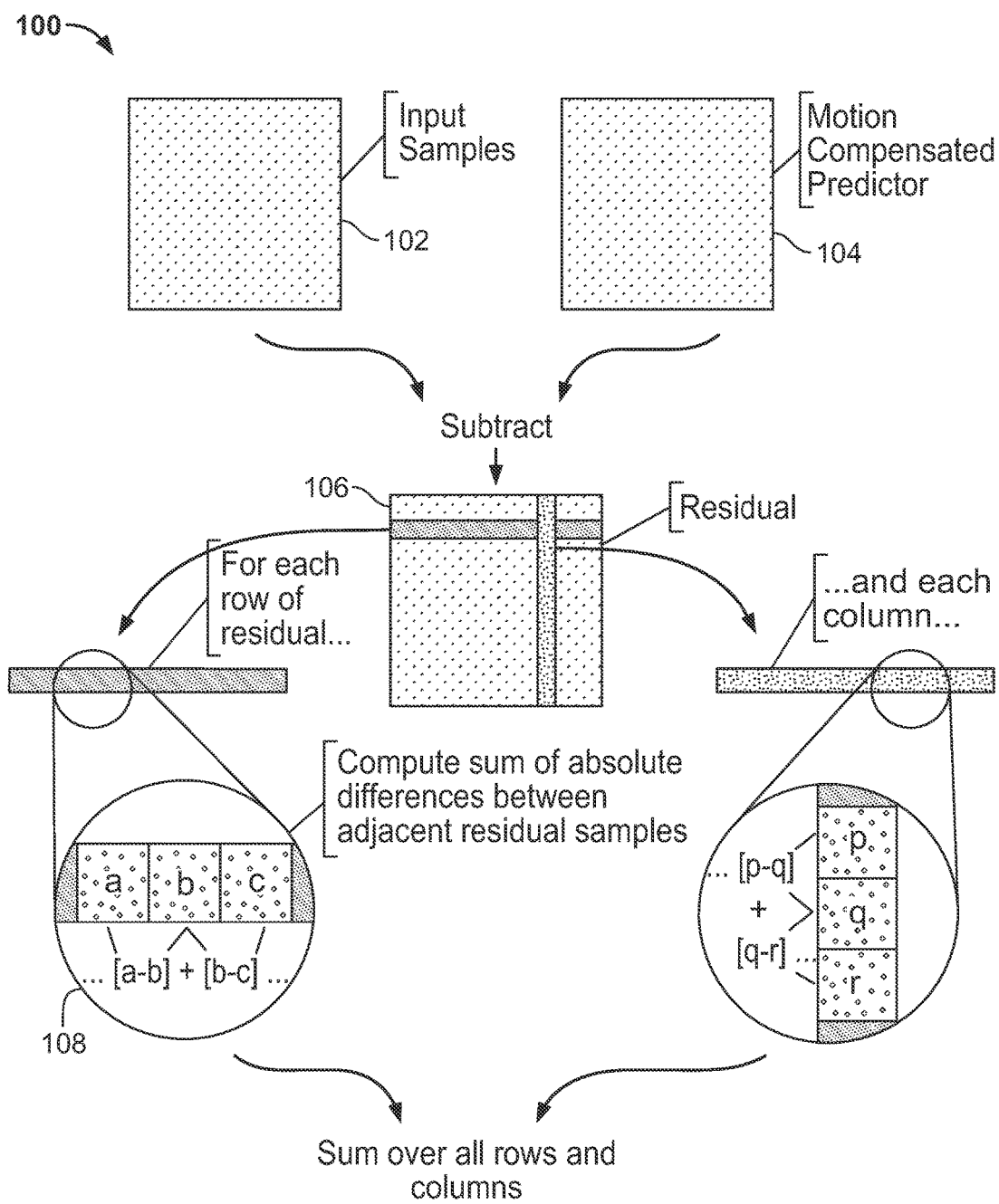
FIG. 1 shows an illustrative diagram of operations that may be performed to determine an optimum motion vector, in accordance with some embodiments of the present disclosure.
Figure 2:
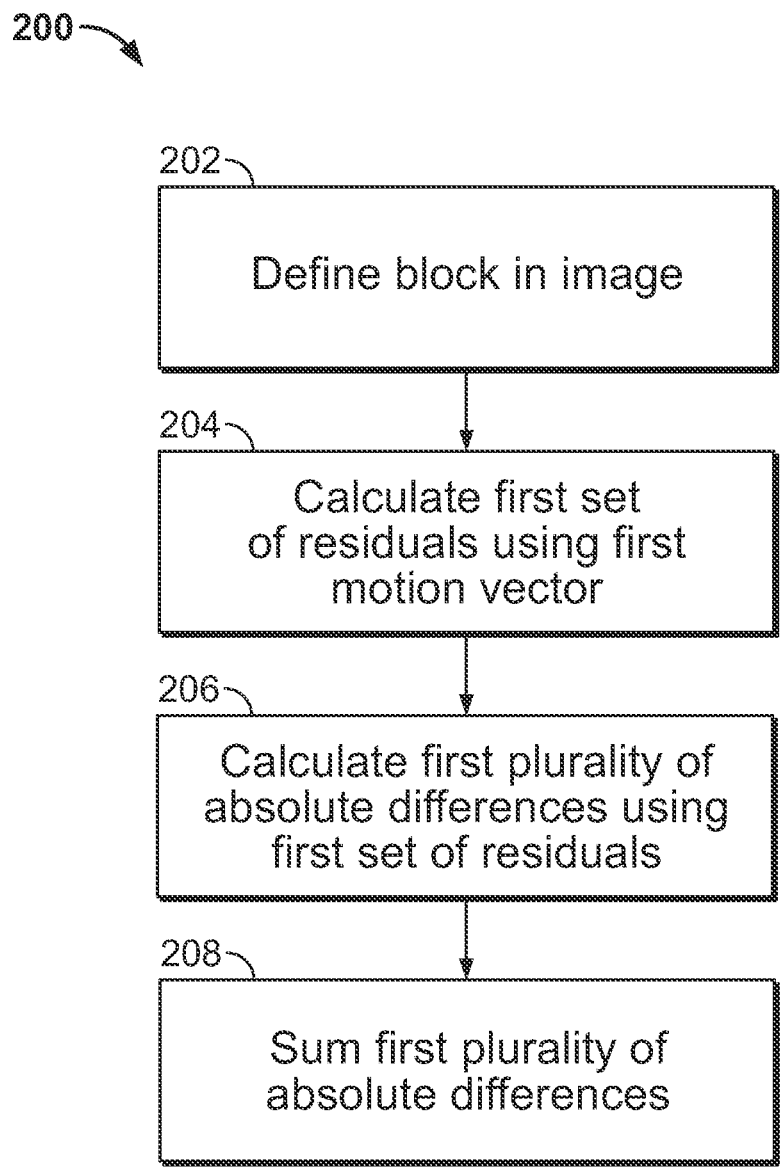
FIG. 2 shows an illustrative flow diagram of a process for finding an optimum vector for motion-compensated prediction in video coding, in accordance with some embodiments of the present disclosure.
Figure 3:
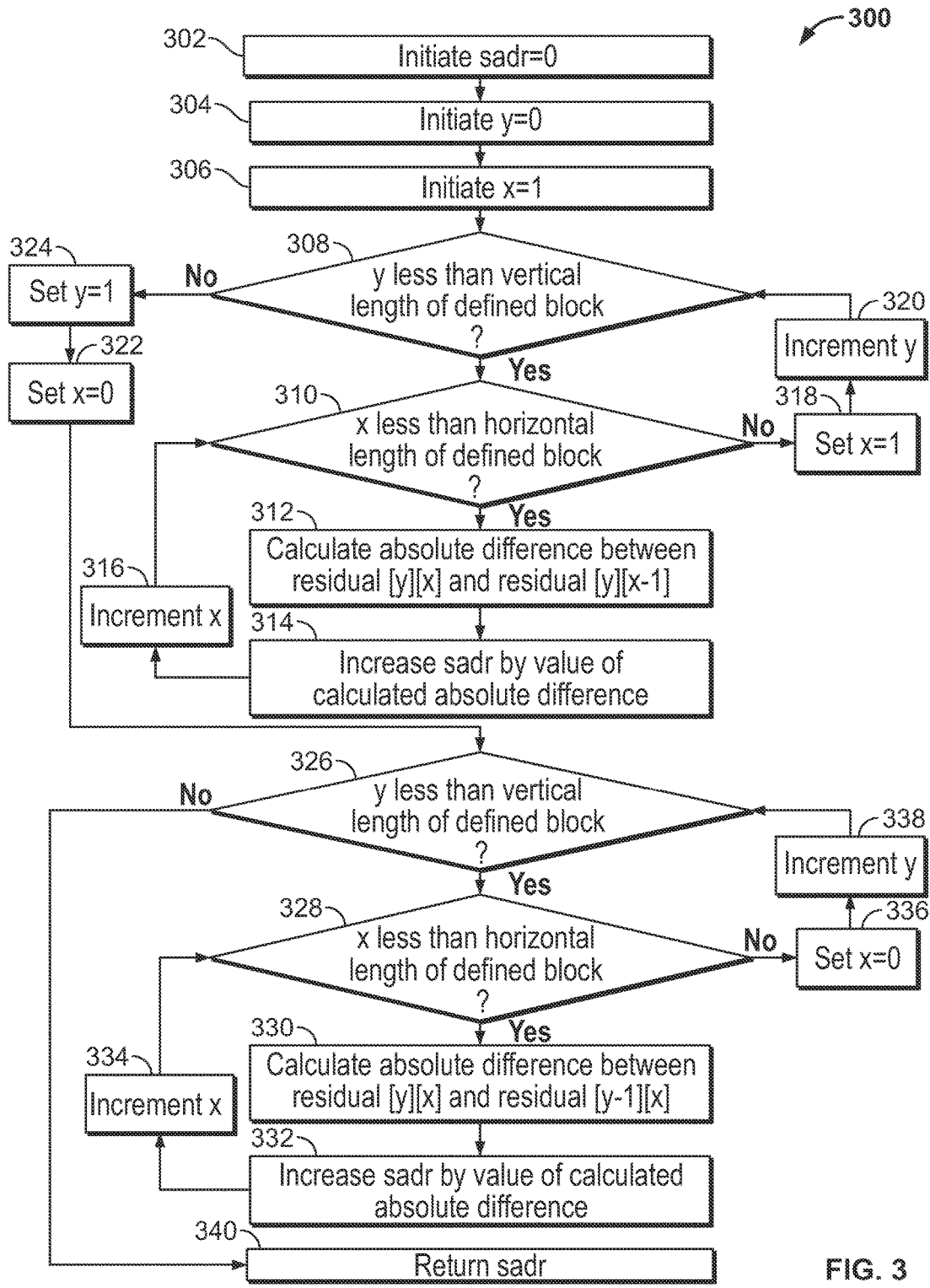
FIG. 3 shows an illustrative flow diagram of a process for finding an optimum motion vector, in accordance with some embodiments of the present disclosure.
Figure 4:
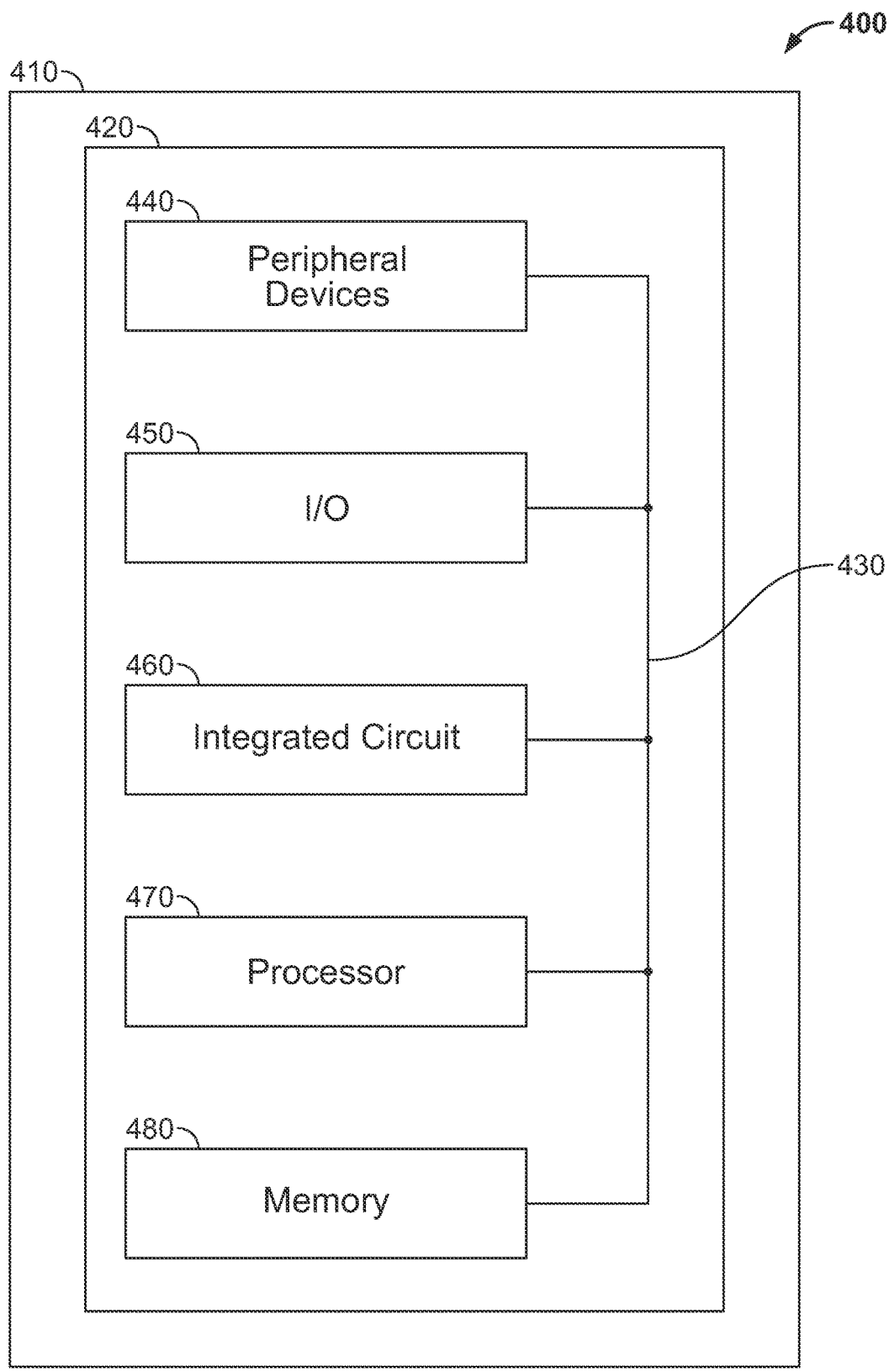
FIG. 4 shows an illustrative system that may be used to implement some embodiments of the present disclosure.

An optimum motion vector for a frame of a video file, or for a group of pixels in the frame, may be determined using various operations and processes, such as those described with respect to FIGS. 1-3. FIG. 4 shows an illustrative system that may be used to implement operations and/or processes for determining an optimum motion vector.

FIG. 1 shows an illustrative diagram 100 of operations that may be performed to determine an optimum motion vector, in accordance with some embodiments of the present disclosure. In FIG. 1, a difference may be calculated between input sample 102 and reference 104, resulting in residual 106. In some embodiments, residual 106 may be calculated using luminance and chrominance values (e.g., using a YCbCr or Y'CbCr color space) of pixels in input sample 102 and reference 104. Input sample 102 may be a frame from a video file, or a group of pixels in a frame. Reference 104 may a motion compensated predictor based on a combination of two or more frames of the video file shifted by a motion vector. Residual 106 may be made up of multiple rows and columns of pixels.

For each row of residual 106, the sum of absolute differences between adjacent samples (e.g., pixels) may be computed. For example, circle 108 shows a magnified view of three adjacent samples a, b, and c from a particular row of residual 106. An absolute difference between samples a and b may be calculated, an absolute difference between samples b and c may be calculated, and the two absolute differences may be summed together. Other absolute differences between other adjacent samples in the same row may also be calculated and added to the sum. Once all absolute differences between adjacent samples in the row containing samples a, b, and c have been calculated and summed, the absolute differences between adjacent samples in other rows of residual 106 may be calculated and summed. The sums of absolute differences for all rows of residual 106 may be added together to obtain a cumulative row sum.

In addition, the absolute differences between adjacent samples in each column of residual 106 may be calculated and summed, in a similar way as may be done for the calculation of the absolute differences between adjacent samples in each row of residual 106. The sums of absolute differences for all columns of residual 106 may be added together to obtain a cumulative column sum. The cumulative column sum may be added to the cumulative row sum to obtain the sum of all absolute differences for residual 106 corresponding to the motion vector used to obtain reference 104.

A sum of all absolute differences may also be calculated using one or more references different from reference 104, for example, using other motion compensated predictors obtained using different motion vectors. The motion vector corresponding to the lowest sum of all absolute differences may be an optimum motion vector for input sample 102.

Operations similar to those described with respect to FIG. 1 may be performed during the processes of FIGS. 2 and 3.

FIG. 2 shows an illustrative flow diagram of a process 200 for finding an optimum vector for motion-compensated prediction in video coding, in accordance with some embodiments of the present disclosure. The elements of process 200 may be carried out by circuitry of an integrated circuit device, as described below with respect to FIG. 4. Process 200 starts at 202, where a block of pixels may be defined in an image. The block may be rectangular in shape, or any other suitable shape. In some embodiments, the block may be defined (e.g., in terms of pixel dimensions) according to or based on a video coding standard, such as MPEG-1, MPEG-2, H.264, or high efficiency video coding (HEVC). In some embodiments, pixels depicting a particular object (e.g., an explosion, a person's face) in the image may be grouped together as a block.

At 204, a first set of residuals may be calculated using a first motion vector. Each residual of the first set of residuals may be calculated by determining the difference between a pixel in the block defined at 202, and the pixel with the same coordinates in a reference image. The reference image may be shifted according to the first motion vector. In some embodiments, the reference image may be shifted by less than one pixel (e.g., by a quarter of a pixel). A residual may be calculated for each pixel in the defined block such that each residual of the first set of residuals corresponds to a respective pixel within the plurality of pixels. In some embodiments, each residual may be calculated using luminance and chrominance values (e.g., using a YCbCr or Y'CbCr color space) of a respective pixel.

At 206, a first plurality of absolute differences may be calculated using the first set of residuals calculated at 204. Each absolute difference in the first plurality of absolute differences may be between a pair of residuals in the first set of residuals, the pair of residuals corresponding to a pair of pixels within the block defined at 202. In some embodiments, calculating the first plurality of absolute differences may involve calculating a first horizontal set of absolute differences and calculating a first vertical set of absolute differences. Calculating the first horizontal set of absolute differences may involve calculating an absolute difference between residuals corresponding to each pair of horizontally adjacent pixels in the defined block. Calculating the first vertical set of absolute differences may involve calculating an absolute difference between residuals corresponding to each pair of vertically adjacent pixels in the defined block.

At 208, the first plurality of absolute differences calculated at 206 may be summed. The summing may be performed by an accumulator, as described further with respect to FIG. 3.

To find an optimum motion vector for a defined block of pixels, the operations of 204, 206, and 208 of process 200 may be repeated for multiple motion vectors. In particular, a second set of residuals may be calculated using a second motion vector. Each residual of the second set of residuals may be calculated by determining the difference between a pixel in the block defined at 202, and the pixel with the same coordinates in a reference image that is shifted according to the second motion vector. Each residual of the second set of residuals may correspond to a respective pixel within the pixels of the block defined at 202.

A second plurality of absolute differences may be calculated using the second set of residuals. Each absolute difference in the second plurality of absolute differences may be between a pair of residuals in the second set of residuals, the pair of residuals corresponding to a pair of pixels within the block defined at 202. In some embodiments, calculating the second plurality of absolute differences may involve calculating a second horizontal set of absolute differences and calculating a second vertical set of absolute differences in the same way as described above with respect to the first horizontal and first vertical sets of absolute differences.

The second plurality of absolute differences may be summed and compared to the sum of the first plurality of absolute differences. The smaller of the sums may be identified, and a representation of the corresponding motion vector may be stored in a memory. In some embodiments, the motion vector may be stored in bit form in a register of a programmable logic device. For a plurality of sums of respective pluralities of absolute differences corresponding to a plurality of respective motion vectors, the smallest of the sums may be identified, and the corresponding motion vector may be an optimum motion vector for the defined block. The plurality of motion vectors may differ from one another by less than one pixel in the horizontal (e.g., x-coordinate) and vertical (e.g., y-coordinate) directions (e.g., different motion vectors being compared may shift a reference image by different amounts, but not by more than half a pixel in any direction), and the vectors may be of any length. A representation of the optimum vector may be stored in a memory.

FIG. 3 shows an illustrative flow diagram of a process 300 for finding an optimum motion vector, in accordance with some embodiments of the present disclosure. In some embodiments, process 300 may be used to carry out the operations of 206 and 208 of process 200. In particular, process 300 may be used to calculate, for a particular motion vector, the sum of all absolute differences between residuals corresponding to all horizontal and vertical pairs of pixels in a defined block that is to be encoded. For example, process 300 may be used to calculate the sum:

$$\sum_{i,j} |Diff(i, j) - Diff(i-1, j)| + \sum_{i,j} |Diff(i, j) - Diff(i, j-1)| \quad (1)$$

for a defined block using a particular motion vector. In equation (1), i and j are the x- and y-coordinates, respectively, of a pixel within the defined block, and the Diff function, whose inputs represent coordinates, calculates the residual of a pixel in the defined block having the given coordinates. In equation (1), the first summation represents the sum of all absolute differences between residuals corresponding to all horizontal pairs of pixels in the defined block, and the second summation represents the sum of all absolute differences between residuals corresponding to all vertical pairs of pixels in the defined block.

In some embodiments, the defined block may have rows numbered from 0 (e.g., the top column) to one less than the number of rows in the block, and columns numbered from 0 (e.g., the left-most column) to one less than the number of columns in the block. For example, a defined block having 4 rows and 3 columns (i.e., a horizontal length of 3 pixels and a vertical length of 4 pixels) may have rows numbered (e.g., from top to bottom) from 0-3 and columns numbered (e.g., from left to right) from 0-2. The elements of process 300 may be carried out by circuitry of an integrated circuit device, as described below with respect to FIG. 4.

Process 300 begins at 302, at which an accumulator for the sum of absolute differences of residuals, "sadr", may be initiated to 0. At 304, a first counter, y, may be initiated to 0. At 306, a second counter, x, may be initiated to 1.

Next, at 308, it may be determined whether the current value of counter y is less than the vertical length (in pixels) of the defined block that is to be encoded. If so, process 300 may proceed to 310, at which it may be determined whether the current value of counter x is less than the horizontal length (in pixels) of the defined block. If so, process 300 may proceed to 312.

At 312, the absolute difference may be calculated between the residual of the pixel, of the defined block, whose row number is equal to the current value of counter y and whose column number is equal to the current value of counter x, and the residual of the adjacent pixel to the left (i.e., the pixel whose row number is equal to the current value of counter y and whose column number is equal to one less than the current value of counter x). Each residual may be calculated with respect to a reference image shifted according to the motion vector for which the sum of absolute differences of residuals is being calculated. Process 300 may then proceed to 314, at which the value in the sadr accumulator may be increased by the value of the absolute difference calculated at 312. Process 300 may then proceed to 316, where counter x may be incremented, and process 300 may loop back to 310.

If, at 310, it is determined that the current value of counter x is not less than the horizontal length of the defined block, process 300 may proceed to 318. Such a determination may signify that the end of a row has been reached, and it may be time to calculate absolute differences between residuals corresponding to pairs of pixels in the next row, if any. Accordingly, at 318, counter x may be set to 1, and at 320, counter y may be incremented. Process 300 may then loop back to 308.

If, at 308, it is determined that the current value of counter y is not less than the vertical length of the defined block, process 300 may proceed to 324. Such a determination may signify that absolute differences between residuals corresponding to all horizontal pairs of pixels in the defined block have been calculated and summed. Accordingly, at 324, counter y may be set to 1, and at 322, counter x may be set to 0 to prepare for the calculation and summing of absolute differences between residuals corresponding to all vertical pairs of pixels in the defined block.

Process 300 may then proceed to 326, where it may be determined whether the current value of counter y is less than the vertical length of the defined block. If so, process 300 may proceed to 328, at which it may be determined whether the current value of counter x is less than the horizontal length of the defined block. If so, process 300 may proceed to 330.

At 330, the absolute difference may be calculated between the residual of the pixel, of the defined block, whose row number is equal to the current value of counter y and whose column number is equal to the current value of counter x, and the residual of the adjacent pixel above (i.e., the pixel whose row number is equal to one less than the current value of counter y and whose column number is equal to the current value of counter x). Each residual may be calculated with respect to a reference image shifted according to the motion vector for which the sum of absolute differences of residuals is being calculated. Process 300 may then proceed to 332, at which the value in the sadr accumulator may be increased by the value of the absolute difference calculated at 330. Process 300 may then proceed to 334, where counter x may be incremented, and process 300 may loop back to 328.

If, at 328, it is determined that the current value of counter x is not less than the horizontal length of the defined block, process 300 may proceed to 336. Such a determination may signify that the end of a row has been reached, and it may be time to move on to the next row of pixels, if any, to calculate absolute differences between residuals corresponding to vertically adjacent pairs of pixels. Accordingly, at 336, counter x may be set to 0, and at 338, counter y may be incremented. Process 300 may then loop back to 326.

If, at 326, it is determined that the current value of counter y is not less than the vertical length of the defined block, process 300 may proceed to 340. Such a determination may signify that absolute differences between residuals corresponding to all vertical pairs of pixels in the defined block have been calculated and summed. Thus, at 340, process 300 may return the value of the sadr accumulator, which is the sum of all absolute differences between residuals corresponding to all horizontal and vertical pairs of pixels in the defined block, calculated using a particular motion vector. The returned value may be stored in a memory and/or transmitted to a comparator to be compared with other sums of absolute differences between residuals calculated using other motion vectors.

It should be understood that the minimum and maximum values of counters y and x in process 300 may be adjusted according to the numbering system used for the rows and columns of the defined block (e.g., the top row may be row 1 and the left-most column may be column 1). In addition, it should be understood that counters y and x may be initialized or reset to their maximum values and be decremented instead of incremented when moving through the defined block to calculate absolute differences of residuals corresponding to horizontally and vertically adjacent pairs of pixels. For example, instead of moving from the top-left to the bottom-right of the defined block, the counters may move from the bottom-right of the defined block to the top-left. Other starting and ending points may be used without departing from the scope and spirit of the embodiments disclosed herein.

It should be understood that one or more elements of process 200 or process 300 may be combined with other elements, performed in any suitable order, performed in parallel (e.g., simultaneously or substantially simultaneously), or removed. For example, the sadr accumulator and counters y and x of process 300 may be initialized simultaneously, or in a different order than shown in FIG. 3. Process 200 and process 300 may be implemented using any suitable combination of hardware and/or software in any suitable fashion.

FIG. 4 shows an illustrative system 400 that may be used to implement some embodiments of the present disclosure. For example, system 400 may be used to implement process 200 or process 300 described above with respect to FIGS. 2-3. System 400 may be or may include a circuit or other device (e.g., processing block, integrated circuit, application specific standard product (ASSP), application specific integrated circuit (ASIC), programmable logic device (PLD), full-custom chip, dedicated chip). System 400 can include one or more of the following components: a processor 470, memory 480, I/O circuitry 450, circuit 460, and peripheral devices 440. The components of system 400 are connected together by a system bus or other interconnections 430 and are populated on a circuit board 420 which is contained in an end-user system 410.

Circuit 460 may be an integrated circuit, ASSP, ASIC, PLD, or any other suitable circuit. Circuit 460 may contain one or more blocks of processing circuitry, such as core circuitry of a PLD. In some embodiments, circuit 460 may include circuitry, such as processing circuitry or core circuitry that performs process 200 and/or process 300.

System 400 may be used in a wide variety of applications, such as computer networking, data networking, instrumentation, video processing, digital signal processing, or any other application where the advantage of using programmable or reprogrammable logic is desirable. Circuit 460 may be used to perform a variety of different logic functions and/or calculate a variety of different mathematical functions. For example, circuit 460 may be configured as a controller or group of processing blocks that work in cooperation with processor 470. Circuit 460 may also be used to perform signal processing. In yet another example, circuit 460 may be configured as an interface between processor 470 and one of the other components in system 400. It should be noted that system 400 is only exemplary, and that the true scope and spirit of the embodiments should be indicated by the following claims.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A method for performing motion-compensated prediction in video coding, the method comprising:
    defining a block in an image, the defined block comprising a plurality of pixels arranged in rows and columns;
    identifying a first reference image corresponding to a first motion vector;
    calculating, using processing circuitry, a first set of residual values by subtracting the first reference image from the block, wherein each residual value of the first set of residual values corresponds to a respective pixel within the plurality of pixels;
    calculating, using the processing circuitry, a first plurality of horizontal absolute difference values, wherein each horizontal absolute difference value in the first plurality of horizontal absolute difference values is calculated between a different respective pair of horizontally-adjacent residual values in the first set of residual values;
    generating, using the processing circuitry, a first plurality of cumulative row sum values, wherein each cumulative row sum value in the first plurality of cumulative row sum values is calculated by summing a respective subset of the first plurality of horizontal absolute difference values, and wherein each subset of the first plurality of horizontal absolute difference values is calculated using a corresponding row of residual values in the first set of residual values; and
    generating, using the processing circuitry, a first sum value by summing each of the cumulative row sum values in the first plurality of cumulative row sum values.

2. The method of claim 1, further comprising:
    calculating, using the processing circuitry, a first plurality of vertical absolute difference values, wherein each vertical absolute difference value in the first plurality of vertical absolute difference values is calculated between a different respective pair of vertically-adjacent residual values in the first set of residual values;
    generating, using the processing circuitry, a first plurality of cumulative column sum values, wherein each cumulative column sum value in the first plurality of cumulative column sum values is calculated by summing a respective subset of the first plurality of vertical absolute difference values, and wherein each subset of the first plurality of vertical absolute difference values is calculated using a corresponding column of residual values in the first set of residual values;

generating, using the processing circuitry, a second sum value by summing each of the cumulative column sum values in the first plurality of cumulative column sum values; and generating, using the processing circuitry, a first final sum value by summing the first and second sum values.

3. The method of claim 1, wherein each residual value in the first set of residual values is calculated using luminance and chrominance values of a respective pixel.

4. The method of claim 1, wherein the first reference image comprises a combination of image frames that are shifted with respect to each other by the first motion vector and by less than one pixel.

5. The method of claim 1, further comprising:
identifying a second reference image corresponding to a second motion vector that is different from the first motion vector;

calculating, using the processing circuitry, a second set of residual values by subtracting the second reference image from the block, wherein each residual value of the second set of residual values corresponds to a respective pixel within the plurality of pixels;

calculating, using the processing circuitry, a second plurality of horizontal absolute difference values, wherein each horizontal absolute difference value in the second plurality of horizontal absolute difference values is calculated between a different respective pair of horizontally-adjacent residual values in the second set of residual values;

generating, using the processing circuitry, a second plurality of cumulative row sum values, wherein each cumulative row sum value in the second plurality of cumulative row sum values is calculated by summing a respective subset of the second plurality of horizontal absolute difference values, and wherein each subset of the second plurality of horizontal absolute difference values is calculated using a corresponding row of residual values in the second set of residual values; and generating, using the processing circuitry, a second sum value by summing each of the cumulative row sum values in the second plurality of cumulative row sum values.

6. The method of claim 1, wherein the defined block is defined based on a video coding standard selected from the group consisting of MPEG-1, MPEG-2, H.264, and high efficiency video coding (HEVC).

7. An integrated circuit device comprising processing circuitry operable to:
define a block in an image, the defined block comprising a plurality of pixels arranged in rows and columns;
identify a first reference image corresponding to a first motion vector;
calculate a first set of residual values by subtracting the first reference image from the block, wherein each residual value of the first set of residual values corresponds to a respective pixel within the plurality of pixels;
calculate a first plurality of vertical absolute difference values, wherein each absolute difference value in the first plurality of vertical absolute difference values is calculated between a different respective pair of vertically-adjacent residual values in the first set of residual values;

generate a first plurality of cumulative column sum values, wherein each cumulative column sum value in the first plurality of cumulative column sum values is calculated by summing a respective subset of the first plurality of vertical absolute difference values, and wherein each subset of the plurality of vertical absolute difference values is calculated using a corresponding column of residual values in the first set of residual values; and generate a first sum value by summing each of the cumulative column sum values in the first plurality of cumulative column sum values.

8. The integrated circuit device of claim 7, wherein the processing circuitry is further operable to calculate each residual value in the first set of residual values using luminance and chrominance values of a respective pixel.

9. The integrated circuit device of claim 7, wherein the first reference image comprises a combination of image frames that are shifted with respect to each other by the first motion vector and by less than one pixel.

10. The integrated circuit device of claim 7, wherein the processing circuitry is further operable to:
identify a second reference image corresponding to a second motion vector that is different from the first motion vector;
calculate a second set of residual values by subtracting the second reference image from the block, wherein each residual value of the second set of residual values corresponds to a respective pixel within the plurality of pixels;
calculate a second plurality of vertical absolute difference values, wherein each vertical absolute difference value in the second plurality of vertical absolute difference values is calculated between a different respective pair of vertically-adjacent residual values in the second set of residual values;
generate a second plurality of cumulative column sum values, wherein each cumulative column sum value in the second plurality of cumulative column sum values is calculated by summing a respective subset of the second plurality of vertical absolute difference values, and wherein each subset of the second plurality of vertical absolute difference values is calculated using a corresponding column of residual values in the second set of residual values; and
generate a second sum value by summing each of the cumulative column sum values in the second plurality of cumulative column sum values.

11. An integrated circuit device that includes circuitry operating on a programmable logic device, the programmable logic device comprising core circuitry configured to:
generate a first reference frame by combining at least two frames of a video file that have been shifted by a first motion vector with respect to each other;
define a block in an image, the defined block comprising a plurality of pixels;
calculate a first set of residual values by subtracting the first reference frame from the block, wherein each residual value of the first set of residual values corresponds to a respective pixel within the plurality of pixels;
calculate a first plurality of absolute difference values, wherein each absolute difference value in the first plurality of absolute difference values is calculated between a different respective pair of residual values in the first set of residual values; and generate a first sum value by summing the first plurality of absolute difference values.

12. The integrated circuit device of claim 11, wherein the core circuitry of the programmable logic device is further configured to calculate the first plurality of absolute difference values by:

calculating a horizontal set of absolute difference values between different respective horizontally-adjacent residual values in the first set of residual values; and calculating a vertical set of absolute difference values between different respective vertically-adjacent residual values in the first set of residual values.

13. The integrated circuit device of claim 11, wherein the core circuitry of the programmable logic device is further configured to:

generate a second reference frame by combining at least two additional frames of the video file that have been shifted by a second motion vector with respect to each other, wherein the second motion vector is different from the first motion vector;

calculate a second set of residual values by subtracting the second reference frame from the block, wherein each residual value of the second set of residual values corresponds to a respective pixel within the plurality of pixels;

calculate a second plurality of absolute difference values, wherein each absolute difference value in the second plurality of absolute difference values is calculated between a different respective pair of residual values in the second set of residual values; and generate a second sum value by summing the second plurality of absolute difference values.

14. The method defined in claim 1, further comprising:
identifying, using the processing circuitry, an optimal motion vector based at least on the generated first sum value; and
storing the optimal motion vector in storage circuitry.

15. The method defined in claim 2, further comprising:
identifying, using the processing circuitry, an optimal motion vector based at least on the generated first final sum value; and
storing the optimal motion vector in storage circuitry.

16. The method defined in claim 2, further comprising:
identifying a second reference image corresponding to a second motion vector that is different from the first motion vector;
calculating, using the processing circuitry, a second set of residual values by subtracting the second reference image from the block, wherein each residual value of the second set of residual values corresponds to a respective pixel within the plurality of pixels;
calculating, using the processing circuitry, a second plurality of horizontal absolute difference values, wherein each horizontal absolute difference value in the second plurality of horizontal absolute difference values is calculated between a different respective pair of horizontally-adjacent residual values in the second set of residual values;
generating, using the processing circuitry, a second plurality of cumulative row sum values, wherein each cumulative row sum value in the second plurality of cumulative row sum values is calculated by summing a respective subset of the second plurality of horizontal absolute difference values, and wherein each subset of the second plurality of horizontal absolute difference values is calculated using a corresponding row of residual values in the second set of residual values; and generating, using the processing circuitry, a third sum value by summing each of the cumulative row sum values in the second plurality of cumulative row sum values.

17. The method defined in claim 16, further comprising:
calculating, using the processing circuitry, a second plurality of vertical absolute difference values, wherein each vertical absolute difference value in the second plurality of vertical absolute difference values is calculated between a different respective pair of vertically-adjacent residual values in the second set of residual values;

generating, using the processing circuitry, a second plurality of cumulative column sum values, wherein each cumulative column sum value in the second plurality of cumulative column sum values is calculated by summing a respective subset of the second plurality of vertical absolute difference values, and wherein each subset of the second plurality of vertical absolute difference values is calculated using a corresponding column of residual values in the second set of residual values;

generating, using the processing circuitry, a fourth sum value by summing each of the cumulative column sum values in the second plurality of cumulative column sum values; and generating, using the processing circuitry, a second final sum value by summing the third and fourth sum values.

18. The method defined in claim 17, further comprising:
identifying, using the processing circuitry, whether the second final sum value is greater than the first final sum value;
in response to identifying that the second final sum value is greater than the first final sum value, identifying, using the processing circuitry, the first motion vector as an optimal motion vector; and
storing the optimal motion vector on storage circuitry.

19. The method defined in claim 18, further comprising:
in response to identifying that the second final sum value is less than the first final sum value, identifying, using the processing circuitry, the second motion vector as the optimal motion vector.

20. The integrated circuit device defined in claim 13, wherein the core circuitry of the programmable logic device is further configured to:
determine whether the first sum value is less than the second sum value;
in response to determining that the first sum value is less than the second sum value, identifying the first motion vector as an optimal motion vector for the block;
in response to determining that the second sum value is less than the first sum value, identifying the second motion vector as the optimal motion vector; and
storing the optimal motion vector on storage circuitry.

* * * * *